United States Patent
Payauys (10) Patent No.: US 10,011,387 B1
(45) Date of Patent: Jul. 3, 2018

(54) CUSTOMIZED RETAIL PACKAGING FOR SHIPMENTS

(71) Applicant: Amazon Technologies, Inc., Seattle, WA (US)

(72) Inventor: Anthony Payauys, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 666 days.

(21) Appl. No.: 14/577,754

(22) Filed: Dec. 19, 2014

(51) Int. Cl.
*B65D 5/42* (2006.01)
*B65B 57/02* (2006.01)
*B65B 61/26* (2006.01)

(52) U.S. Cl.
CPC ............ *B65D 5/4212* (2013.01); *B65B 57/02* (2013.01); *B65B 61/26* (2013.01); *B65B 2210/04* (2013.01)

(58) Field of Classification Search
CPC ....... B65B 57/02; B65B 57/10; B65B 61/025; B65B 61/26; B65B 2210/04; B65D 5/4212; B65D 5/4216; B41J 3/286; B65C 2009/401
USPC ..... 53/411, 415, 131.2, 131.4, 135.2, 136.1; 40/306, 312
See application file for complete search history.

(56) References Cited

U.S. PATENT DOCUMENTS

| | | | | |
|---|---|---|---|---|
| 4,136,503 A * | 1/1979 | Miller | ..................... | B65B 57/02 235/454 |
| 4,769,650 A * | 9/1988 | Peng et al. | ................. | B41J 2/01 347/16 |
| 5,156,088 A * | 10/1992 | Tohdo | ..................... | B41F 17/24 101/35 |
| 5,342,461 A * | 8/1994 | Murphy | ..................... | B65C 9/42 156/360 |
| 5,425,823 A * | 6/1995 | Woodside, III | ........... | B65C 1/02 156/277 |
| 6,953,207 B2 * | 10/2005 | Raming | ............... | B42D 15/006 206/216 |
| 7,341,199 B2 * | 3/2008 | Dunlap, Jr. | ............... | B65C 9/40 235/435 |
| 8,261,983 B2 * | 9/2012 | Sarma | ................... | G06F 3/1205 235/380 |
| 8,322,061 B1 * | 12/2012 | Kraft | ..................... | G09F 3/0289 283/81 |

(Continued)

FOREIGN PATENT DOCUMENTS

| | | | | |
|---|---|---|---|---|
| DE | 3303109 A1 * | 8/1984 | ............. | G01G 19/40 |
| EP | 0088630 A2 * | 9/1983 | ............. | B41J 3/286 |
| WO | WO2011/008416 A1 | 1/2011 | | |

*Primary Examiner* — Stephen F Gerrity
(74) *Attorney, Agent, or Firm* — Lee & Hayes, PLLC (57) ABSTRACT

A shipment container may be designed to provide information similar to retail packaging on the inside surfaces of the shipment container while providing customizable exterior surfaces. The interior surfaces may include content, graphics, text, and/or other information related to the contents of the shipment container. Initially, the exterior surfaces of the shipment container may be left primarily blank in anticipation of a later printing of customized graphics for a customer by a merchant or fulfillment center (FC) that prepares the shipment container for shipment to a customer. During processing of the shipment container, the merchant or FC may analyze the shipment container (e.g., size, shape, etc.) and the order of the item to determine custom graphics to print on the shipment container. The custom graphics may be selected in real-time or near real-time to enable up-to-date information, such as advertisements, notifications, and messages.

19 Claims, 7 Drawing Sheets

(56) References Cited

U.S. PATENT DOCUMENTS

| | | | | |
|---|---|---|---|---|
| 2001/0002574 A1* | 6/2001 | Miyazaki | ................ | B65B 61/26 101/35 |
| 2002/0066688 A1* | 6/2002 | Autterson | ............ | B65D 5/4216 206/459.5 |
| 2002/0117405 A1* | 8/2002 | Wang et al. | .......... | B65B 25/008 206/5.1 |
| 2003/0166443 A1* | 9/2003 | May | ........................ | B31B 50/00 493/320 |
| 2003/0236715 A1* | 12/2003 | Leo | ........................ | G06Q 30/02 705/26.5 |
| 2004/0241432 A1* | 12/2004 | Hollander | ............ | B65D 5/0236 428/343 |
| 2005/0004878 A1* | 1/2005 | Malone | .............. | G06Q 30/0283 705/400 |
| 2006/0075329 A1* | 4/2006 | Sullivan et al. | ......... | B65B 61/26 715/221 |
| 2007/0248394 A1* | 10/2007 | Isowa | ...................... | B41J 3/286 400/76 |
| 2008/0103621 A1* | 5/2008 | Mantell | ................. | B65B 61/025 700/115 |
| 2008/0319566 A1* | 12/2008 | McGuinness, Jr. | ..... | B65B 67/08 700/97 |
| 2011/0297559 A1* | 12/2011 | Davis | ................... | B65B 25/008 206/5.1 |
| 2013/0067865 A1* | 3/2013 | Maruo | .................... | B65B 11/00 53/461 |
| 2013/0152506 A1* | 6/2013 | Pradeep | ............. | G06Q 30/0268 53/411 |
| 2015/0019387 A1* | 1/2015 | Pettersson et al. | .......................... | G06Q 30/0635 705/26.81 |
| 2015/0096266 A1* | 4/2015 | Divine et al. | ....... | B29C 67/0088 53/452 |
| 2015/0102100 A1* | 4/2015 | Hattrup et al. | ......... | G06Q 50/28 235/375 |

\* cited by examiner

CUSTOMIZED RETAIL PACKAGING FOR SHIPMENTS

BACKGROUND

Fulfillment of electronic commerce (e-commerce) purchases often involves obtaining an item packaged for retail, putting the packaged item in a corrugate box (an over-box) with packing material, attaching an adhesive shipping label to the corrugate box, and then providing the labeled box to a carrier for shipment to a customer. This continues to be a common order-fulfillment practice. In some cases, e-commerce merchants order over-boxes that are pre-printed with the merchant's logo and branding to build their brand and customer awareness.

Customers expect their shipped purchases to arrive protected in an appropriate amount of sustainable and easy-to-open packaging, which is typically accomplished using corrugate, a brown cardboard box, as an over-box. Customers making purchases in physical retail stores are accustomed to retail packaging, which has a key role in positioning the product with the customer, fulfilling purchase triggers, and mitigating buyer remorse. As a result, many customers have specific expectations about how their purchased item will be packaged for shipment, and perceptions about the item when it arrives via a shipment and is not packaged in retail packaging. Items that do not arrive in retail packaging can be considered by some customers as being something other than genuine, new items. Other packaging concerns relate to concealment of content in a box to lessen a potential for theft and/or to maintain an element of surprise as to the content of the box.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2A is an isometric view of an illustrative shipment container showing interior surfaces. FIG. 2A shows the shipment container prior to customized printing of exterior surfaces of the shipment container.

FIG. 2B is a top view of a flattened configuration of the illustrative shipment container shown in FIG. 2A. FIG. 2B shows the interior surfaces of the illustrative shipment container.

FIG. 2D is bottom view of the flattened configuration of the illustrative shipment container shown in FIG. 2C. FIG. 2D shows the exterior surfaces of the illustrative shipment container.

DETAILED DESCRIPTION

This disclosure is directed to customization of a shipment container (e.g., a box, a package, etc.) used by a merchant to ship an item to a customer. The shipment container may include interior surfaces that provide content, graphics, text, and/or other information related to the contents of the shipment container. For example, the shipment container may be a corrugated box that includes printed retail markings on an inside of the box that are similar to the retail markings on the outside of typical retail packaging of the product sold in conventional physical retail stores. Thus, the shipment container appears as an "inside-out" version of the typical retail packaging, but possibly with other differences as noted herein.

The shipment container may be packed, possibly by the manufacturer, with the corresponding item(s), packing materials, documentation, and other contents. The exterior surfaces of the shipment container are left primarily blank, and thus contain little or no markings. The exterior surfaces of the shipment container may be optimized for custom printing on the exterior surfaces by a merchant or fulfillment center (FC) that prepares the shipment container for shipment to a customer. In some embodiments, the shipment container may contain or be associated with an identifier used to provide information associated with the shipment container. The identifier may be associated with an order number, an item number, a barcode, a radio frequency identifier (RFID), and/or other identification information.

During processing of the item, the merchant or FC may analyze the shipment container (e.g., size, shape, etc.) and the order of the item to determine content to print on the shipment container. For example, the merchant may determine to print address information, a logo of a source of the item, an image associated with the merchant, a customer message, a physical decoration, a pattern, an order identifier, and/or other text, images, and/or other graphics. The printing may be customized for the shipment container such that two shipment containers containing the same items may be printed with different customized graphics as well as different addresses. The graphics may be selected in real-time or near real-time to enable up-to-date graphics, such as advertisements, notifications, and messages. For example, a shipment container that is processed for shipping on or near the start of January may be printed, during processing, to include a message of "Happy New Year," while the same package, if processed in July, may include a different message or no message.

When the customer receives the shipment container, the contents of the container may or may not be indicated by the graphics printed on the shipment container. However, after opening the shipment container, the customer may see the retail printing on the inside of the shipment container and identify the contents as being authentic goods from the manufacturer. Thus, by printing on both sides of the box, the over-box may enable a single-box solution that meets or exceeds customer expectations.

As used herein, the terms "shipment container," "box," and "package" are used interchangeably to mean a container that includes one or more sides that are polygons (e.g., rectangular, square, hexagon, etc.), curved, angled, and/or circular, and have surface areas that surround and contain one or more items in a secure or partially secure manner during transport (e.g., to prevent damage during shipping to a customer, to organize parts of the one or more items for presentation, etc.). For example, the shipment container may contain packing materials to secure the items in the shipment container. The shipment container may be formed of corrugated cardboard, paperboard, fiberboard, plastic and/or other types of materials that include printable surfaces.

The techniques, apparatuses, and systems described herein may be implemented in a number of ways. Example implementations are provided below with reference to the following figures.

Figure 1:
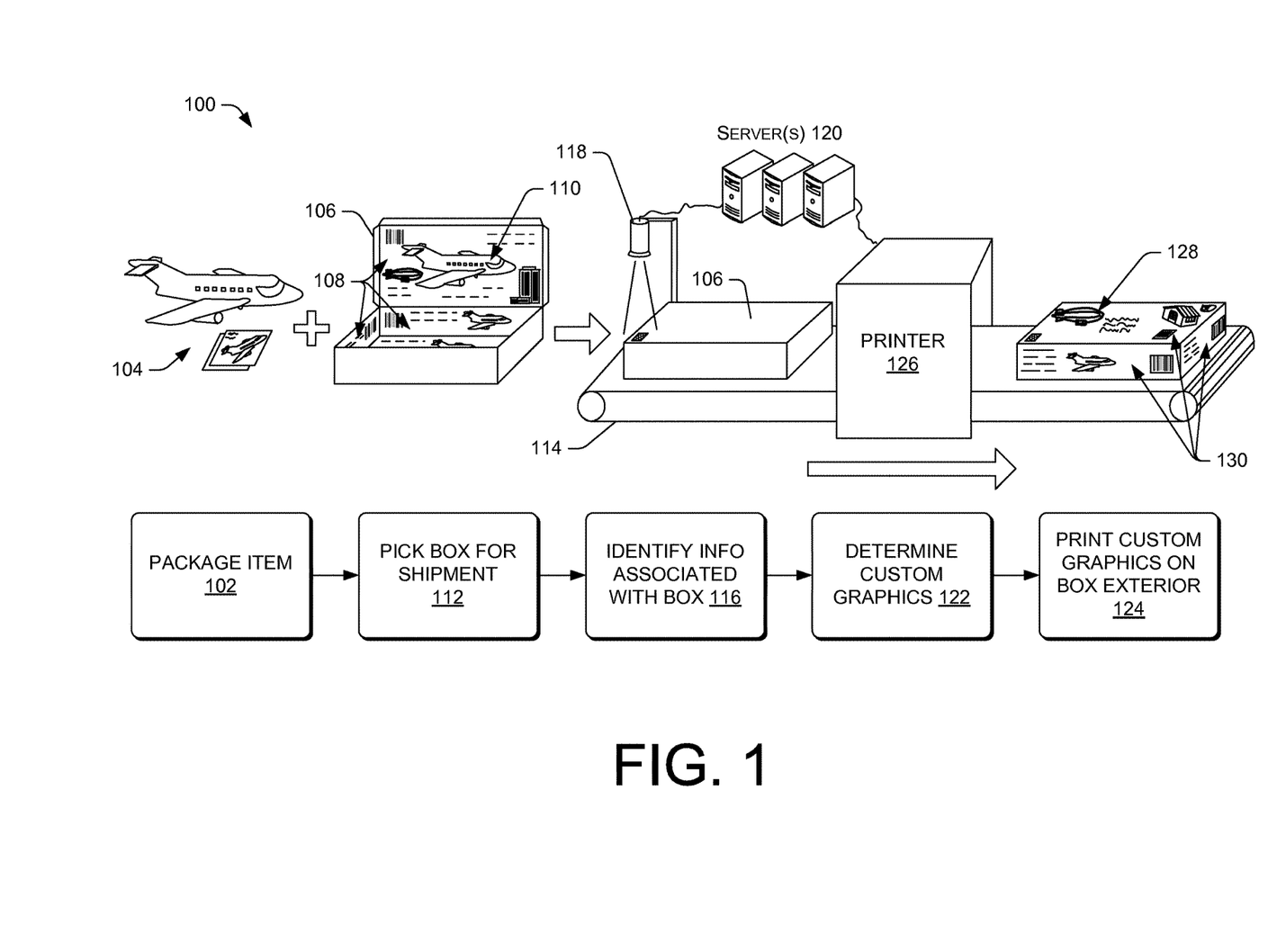
FIG. 1 is a pictorial flow diagram of an illustrative process of processing a customizable shipment container for shipment.

FIG. 1 is a pictorial flow diagram of an illustrative process 100 of processing a customizable shipment container for shipment. The processing may be performed in part by one or more entities, such as a manufacturer, a merchant, and/or a FC that processes shipments for the manufacturer and/or the merchant.

At 102, one or more items 104 may be packaged in a customizable shipment container 106. The items 104 may include one or more items desired by a customer (e.g., a toy, a tool, a consumable product, etc.), documentation, packing materials, and/or other contents to be provided to a purchaser (customer). The shipment container 106 may include interior surfaces 108 that include internal graphics 110. The internal graphics 110 may include images, text, logos, patterns, designs, and/or other information included on the interior of the shipment container and related to the contents of the shipment container. For example, the shipment container 106 may be a corrugated box that includes printed retail markings on the interior surface(s) of the box that are similar to the retail markings on the outside of typical retail packaging of the product sold in conventional physical retail stores. Thus, the shipment container appears as an "inside-out" version of the typical retail packaging, but possibly with other differences as noted below. Thus, at 102, the shipment container 106 may be packed, possibly by the manufacturer, with the corresponding items, packing materials, documentation, and other contents to be provided to a customer or recipient. The exterior of the shipment container 106 is left primarily blank, and thus contains little or no markings. The exterior of the shipment container 106 may be optimized for custom printing on the exterior surfaces by a merchant or FC that prepares the shipment container for shipment to a customer. Optimization may include providing a smooth, clean surface for printing and/or other processes.

At 112, the shipment container 106 may be "picked" for shipment to a customer. For example, the shipment container 106 may be stored in a bin at a FC (e.g., a shipment warehouse). A person or machine may obtain the shipment container 106, which contains the item(s) 104, and place the shipment container on a processing track 114 (e.g., a conveyer belt). The processing track 114 may transport the item and shipment container 106 through a customization process described below.

At 116, the shipment container 106 may be identified by a sensor 118. For example, the sensor 118 may be an imaging sensor (e.g., a camera) that is capable of capturing imagery of an image code (e.g., barcode, quick response (QR) code, etc.), used to accesses identification information associated with the shipment container 106. The sensor 118 may be a radio frequency identifier (RFID) sensor, a near field communication (NFC) sensor, a tactile sensor (e.g., Braille-type sensor), and/or other types of sensors capable of extracting an identifier from the shipment container 106 or possibly from a fob, tray, or other source associated with the shipment container 106. The identification information may include any of an order identifier, an item identifier, a customer identifier, a merchant identifier, a manufacturer identifier, and/or other relevant identifiers, each associated by servers 120 with related information.

At 122, the servers 120 may determine custom graphics for the specific order to be printed on the exterior surface or exterior surfaces of the shipment container 106. The custom graphics for the shipment container 106 may be customized such that two shipment containers containing the same items may be printed with different graphics as well as different addresses. The graphics may be selected in real-time or near real-time to enable up-to-date graphics, advertisements, notifications, and messages. For example, a shipment container that is processed for shipping on or near the start of January may be printed, during processing, to include a message of "Happy New Year," while the same package, if processed in November, may include a message of "Happy Thanksgiving," a different message, or no message.

The servers 120 may use the identification information from the operation 116 to determine information about the order placed by the customer, the merchant, the manufacturer, and/or other information, which may be used to determine the custom graphics. In some embodiments, a sensor (e.g., the sensor 118 or another sensor) may analyze attributes of the shipment container 106 to determine printable surfaces and/or areas of the shipment container 106, which may be used in the selection of the graphics, positioning of the graphics, and/or sizing of the graphics. As an example, the custom graphics may be selected to identify a merchant that sold the items 104 to the customer, which may be different than an operator of the FC that processes the shipment. The custom graphics may provide targeted advertising to a specific user that ordered the items 104. For example, the custom graphics may provide a recommendation for other items that may be of interest to the customer based on shopping history of the customer and/or other historical information. The custom graphics may also provide package tracking identifiers, shipping information, postage, and/or other messages, logos, physical decorations, patterns, and/or graphics, each uniquely selected for the particular shipment container.

At 124, the server 120 may cause a printer 126 or other labeling device to print or otherwise apply customized graphics 128, and attributes thereof, on one or more exterior surfaces 130 the shipment container 106. Those skilled in the art will appreciate that the printer or labeling device may be any suitable electronic and/or robotic device capable of printing, stamping, adhering, embossing, attaching or otherwise applying a customized graphic to a surface of an object. The printer or labeling device may be a standalone device, or a component of another device. The customized graphic 128 may be printed or embossed in ink, paint, etc., or may take the form of a sticker, label, tag, film, etc. In some embodiments, a seal, decoration, or other object may be affixed (by the printer or another labeling device) to the shipment container 106 before or after the printing to signify authenticity of a source of the shipment container and/or for other reasons. When the customer or recipient ultimately receives the shipment container, the contents of the container may or may not be indicated by the graphics printed on the shipment container. However, after opening the shipment container, the customer or recipient may see the retail graphics on the inside of the shipment container and identify the contents as being authentic and new goods from the manufacturer.

Figure 2A:
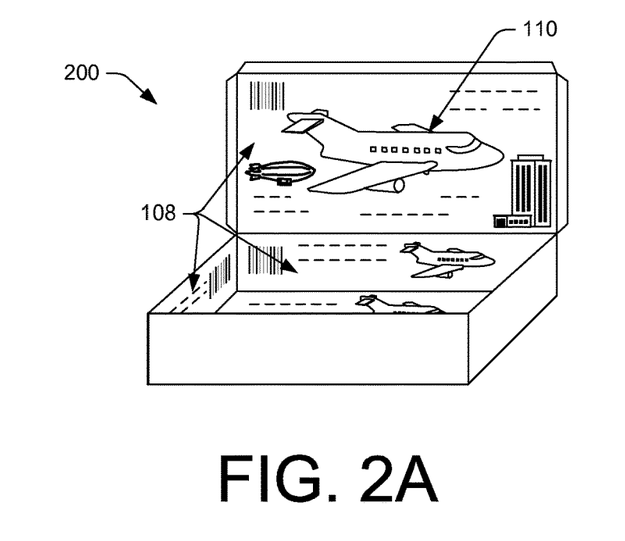

FIG. 2A is an isometric view of an illustrative shipment container 200 showing the interior surfaces 108 prior to customized printing of exterior surfaces of the shipment container. The interior surfaces 108 are printed or otherwise include internal graphics 110. The internal graphics 110 may include images, text, logos, patterns, designs, and/or other information included on the interior surfaces 108 of the shipment container and related to the items contained within the shipment container. For example, the shipment container 200 may be a corrugated box that includes traditional retail-type markings on the interior surface(s) of the box that are similar to the retail markings on the outside of typical retail packaging of the product sold in conventional physical retail stores. Thus, the shipment container appears as an "inside-out" version of the typical retail packaging, but possibly with other differences.

Figure 2B:
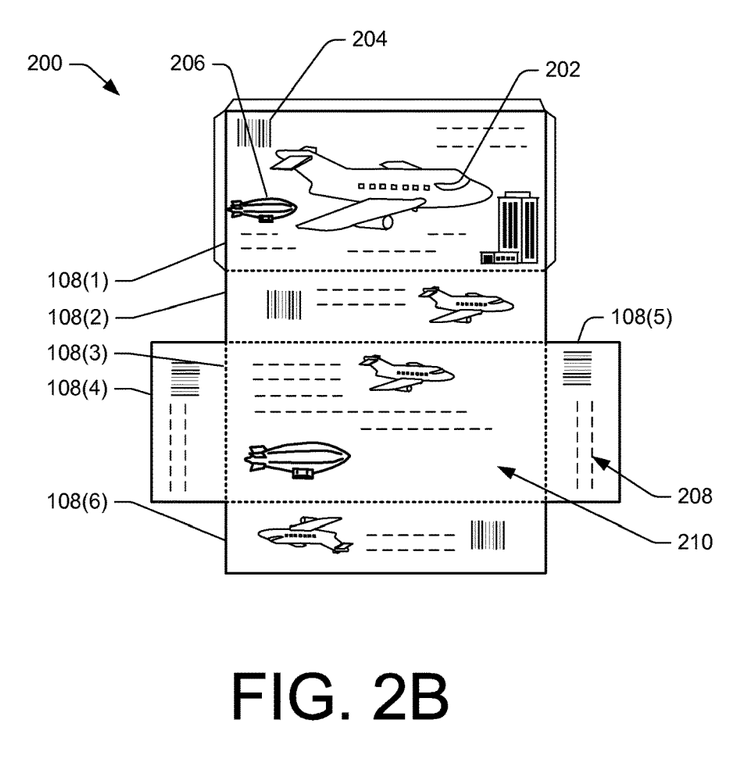

FIG. 2B is top view of a flattened configuration of the illustrative shipment container 200 shown in FIG. 2A. FIG. 2B shows each of the interior surfaces 108 of the illustrative shipment container, which are represented as interior surfaces 108(1), 108(2), 108(3), 108(4), 108(5), and 108(6), associated with respective ones of the six surfaces of a rectangular box. However, the shipment container 200 may have more or fewer surfaces depending on the shape of the shipment container 200. For example, a cylindrical shipment container 200, which may be used to ship bottles of wine or other beverages or items, may effectively have three surfaces (e.g., two circle-shaped surfaces and one rectangle-shaped surface).

The interior surfaces 108 may include internal graphics 110 that are the same as, similar to, or mimic traditional markings conventionally found on the outside of typical retail packaging of the product sold in conventional physical retail stores. Thus, when the customer views the internal graphics 110, the customer may view information about the item, the contents of the box, and other related information that the customer would expect to find on a traditional package of the item. The internal graphics 110 may include an image of the item 202 contained in the shipment container 200, identifiers 204, manufacturer logos and information 206, side panel information 208 and/or back panel information 210. Some of the interior surfaces may include the same or similar content. In some embodiments, some of the interior surfaces may not include graphics.

The internal graphics 110 may be selected by and/or applied by the manufacturer of the item or a third party. For example, the shipment container 200 may be printed in advance (e.g., by a batch process) by a manufacturer specifically for an item to be placed into the shipment container. The shipment container may then be assembled by the manufacturer (as shown in FIG. 2A) and packed with the items prior to shipment to a merchant. At this point, the exterior surfaces of the shipment container 200 may be completely or mostly blank. However, in some embodiments, the shipment container may be completely printed and possibly assembled by the same entity that performs the printing of the custom graphics on the exterior surfaces of the shipment container.

Figure 2C:
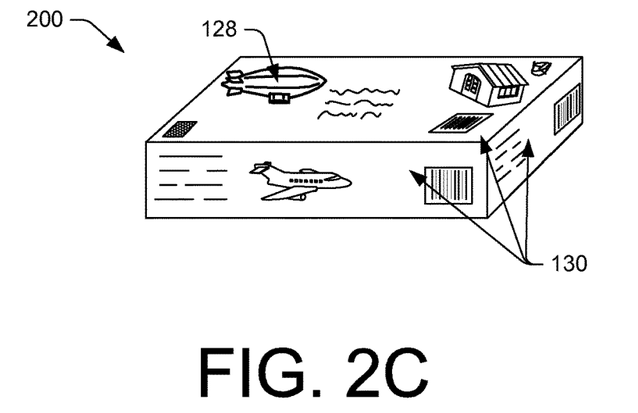
FIG. 2C is an isometric view of the illustrative shipment container in a closed configuration and showing exterior surfaces of the shipment container after printing of customized graphics on the exterior surfaces of the shipment container.

FIG. 2C is an isometric view of the illustrative shipment container showing the exterior surfaces 130 of the shipment container after printing of customized graphics 128 on the exterior surfaces of the shipment container. The customized graphics 128 may include images, text, logos, patterns, designs, and/or other information. The information may be related to shipping information (e.g., tracking number, addresses, postage, etc.), merchant information, manufacturer information, and/or other information (e.g., advertising, personal messages, greetings, recommendations, etc.). The content to be printed on the shipment container may be determined dynamically during the initial stages of shipment of the shipment container at the FC. By making the determination as close in time as possible to the time of the printing, the content may be as up to date as possible, such as to include most recent advertising and/or recommendations, most recent address information, most recent messages and/or greetings.

Figure 2D:
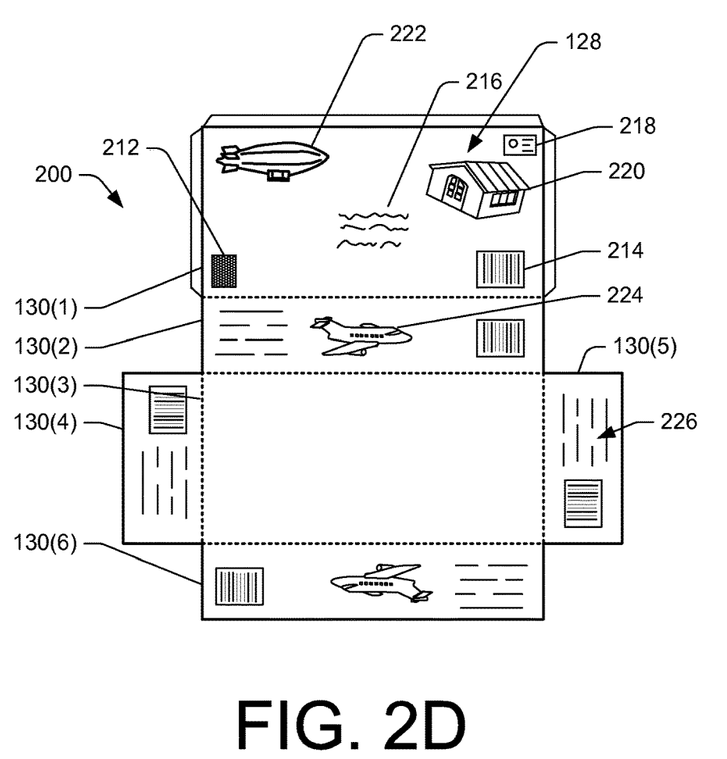

FIG. 2D is bottom view of the flattened configuration of the illustrative shipment container shown in FIG. 2C. FIG. 2D shows the exterior surfaces 130 of the illustrative shipment container, which are represented as exterior surfaces 130(1), 130(2), 130(3), 130(4), 130(5), and 130(6), associated with respective ones of the six surfaces of a rectangular box. However, the shipment container 200 may have more or fewer surfaces depending on the shape of the shipment container.

In some embodiments, the shipment container may include an identifier 212. The identifier may be scanned by a sensor (e.g., the sensor 118 shown in FIG. 1) and used to associate information with the shipment container, which may have external surfaces that are otherwise blank or have minimal markings. For example, the identifier may be a printed or removable image code (e.g., a barcode, QR code, etc.), an RFID (passive RFID and/or active RFID), and/or other types of identifiers coupled to the shipment container. In some embodiments, the identifier may be a removable identifier at least partially covering and removable from (e.g., not adhesively attached so as to prevent or significantly impede removal) to at least a portion of one of the exterior surfaces that is configured for receiving the custom graphic. The removable identifier, when removed, may reveal the portion as unaltered and configured to receive the custom graphic. The identifier may also be associated with the shipment container, but be later removed from or unassociated with the shipment container, such as by way of an adhesive, a separate fob, tray, position/marker on the processing track, and so forth.

The customized graphics 128 may include printed shipping information, such as a tracking identifier 214, an address 216, and postage 218. The postage may be calculated and printed based on analysis of the shipment container (e.g., size, weight, destination, priority, etc.) prior to the printing.

In some embodiments, the customized graphics 128 may selectively include one or more other graphics depending on a nature of the shipment, as discussed below. The customized graphics 128 may include merchant information 220, such as a logo associated with the merchant, an image, a design, text, a pattern, and/or other trademarked or non-trademarked identifiers of the merchant. The customized graphics 128 may include manufacturer information 222, such as a logo associated with the manufacturer, an image, a design, text, a pattern, and/or other trademarked or non-trademarked identifiers of the manufacturer. The customized graphics 128 may include item information 224, such as an image, a design, text, a pattern, and/or other trademarked or non-trademarked identifiers of the item contained in the shipment container. The customized graphics 128 may include other information 226, such as an image, a design, text, and/or other trademarked or non-trademarked information, which may include advertisements, messages, personalized messages from a purchaser of the item, greetings, notices, recommendations, and/or other information relevant to the recipient of the shipment container.

As shown in FIG. 2D, some of the external surfaces 130 of the shipment container may be subject to printing while other external surfaces may not be, such as the external surface 130(3), which may be a bottom surface as the shipment container is run through the printer 126 shown in FIG. 1, via the processing track 114. Other surfaces may be left blank for other reasons, such as due to limitations of the printer 126. However, in some embodiments, all surfaces may be subjected to printing, which may involve reorienting the shipment container during a printing process to expose an exterior surface of the shipment container to printing heads of the printer.

Figure 3:
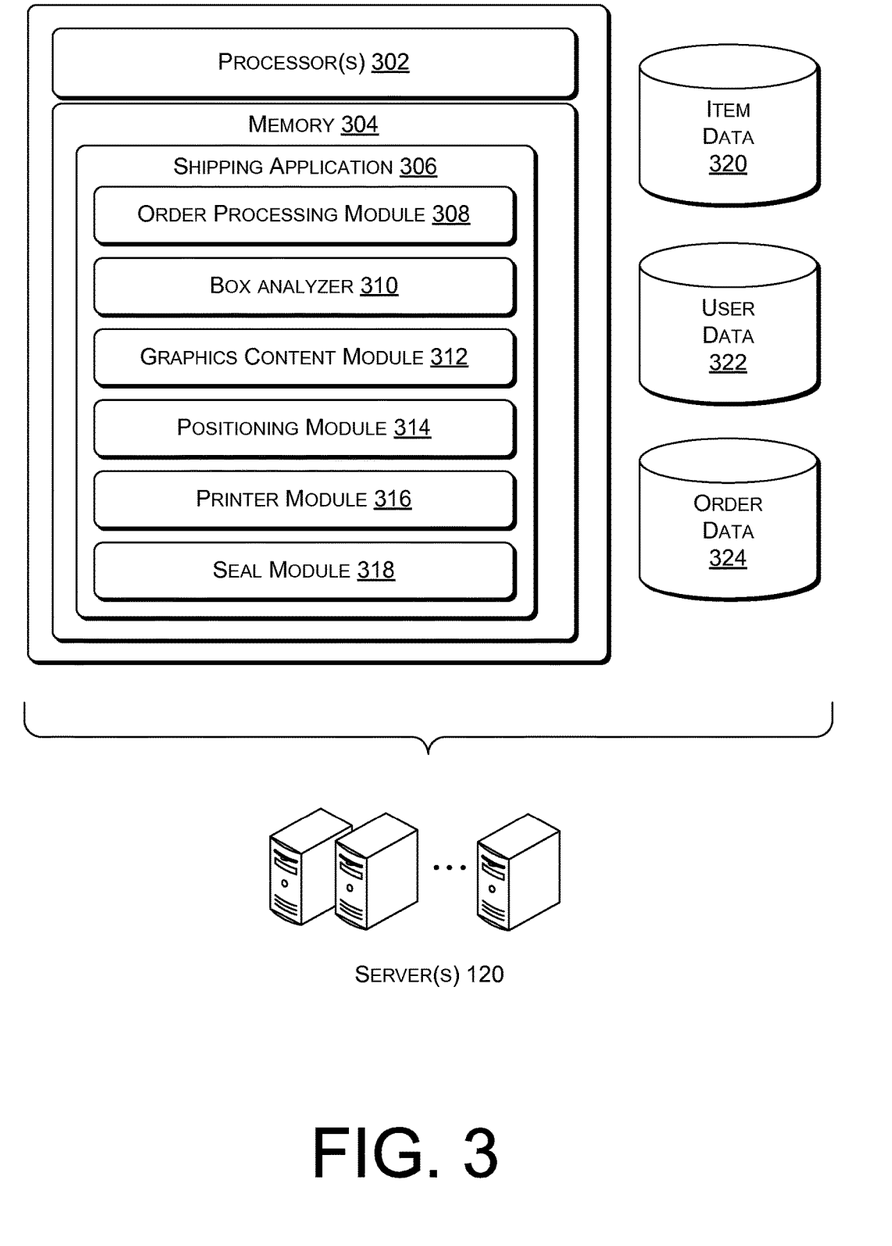
FIG. 3 is a block diagram of an illustrative computing architecture to create and process customized retail packaging for shipments.

FIG. 3 is a block diagram of an illustrative computing architecture 300 to create and process customized retail packaging for shipments. The computing architecture 300 may be implemented in a distributed or non-distributed computing environment.

The computing architecture 300 may include one or more processors 302 and one or more computer readable media 304 that stores various modules, applications, programs, or other data. The computer-readable media 304 may include instructions that, when executed by the one or more processors 302, cause the processors to perform the operations described herein.

Embodiments may be provided as a computer program product including a non-transitory machine-readable storage medium having stored thereon instructions (in compressed or uncompressed form) that may be used to program a computer (or other electronic device) to perform processes or methods described herein. The non-transitory machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 304 may store a shipping application 306, which may include an order processing module 308, a box analyzer 310, a graphics content module 312, a positioning module 314, a printer module 316, and a seal module 318, which are described in turn. The computing architecture 300 may also include or have access to item data 320, user data 322, and order data 324. The components may be stored together or in a distributed arrangement.

The order processing module 308 may populate the shipment information based on information associated with an order, such as information from one or more of the item data 320, the user data 322, and the order data 324. The shipment information may include an address, a customer, an identification of the item, personalized information (e.g., personalized messages, personalized preferences, user selections) and/or other relevant information. For example, purchasers may make selections about customized graphics, such as to select a preference to make the item a gift and/or otherwise conceal an identity of the item by way of minimizing printing on the exterior surfaces. In some embodiments, the order processing module may infer such preferences based on the type of order, such as based on cost, size, etc. The order processing module 308 may track the identifier 212 associated with the shipment container 200 to enable association of the shipment information with the shipment container 200.

The box analyzer 310 may extract the identifier from the shipment container 200, such as by scanning an image code, triggering a radio communication, etc. The box analyzer 310 may analyze the size, shape, borders and position of the shipment container as the shipment container moves along the processing track 114 toward the printer 126. For example, the box analyzer 310 may determine information used to select a best surface or surfaces for printing. The box analyzer 310 may also determine other information about the box, such as weight and/or other information used to verify contents of the shipment container, calculate shipping costs, and/or determine routing (e.g., extra heavy box, extra large box, etc.)

The graphics content module 312 may select the customized graphics 128 to print on the shipment container based at least in part on input from the order processing module 308 (e.g., using the order information) and the information from the box analyzer 310. The graphics content module 312 may select graphics (text, images, patterns, design, etc.), size, location (e.g., assignment of surfaces to receive the graphics), font, etc. The graphics may be selected based on information and/or graphics in the item data 320, the user data 322, and the order data 324. In some embodiments, the amount of the graphics may be limited by the size and dimensions of the shipment container, borders of printable areas, and/or the surfaces available on the shipment container. For example, if the shipment container is a smaller box, then the amount of graphics that can be printed on the box may be less than an amount of graphics that can be printed on a larger box. Similarly, some surfaces may not be conducive for printing, such as curved surfaces. The graphics content module may modify the graphics content, possibly by resizing it and/or removing portions to accommodate printing on the selected exterior surfaces of the shipment container. In some embodiments, the graphics content module 312 may analyze the user data 322 and/or other data to determine recommendations for the user, messages for the user, and/or other relevant information to personalize the custom graphics.

The positioning module 314 may adjust the position of the shipment container prior to arrival at the printer 126 and/or after interaction with the printer 126. For example, the positioning module 314 may rotate, flip, angle, or otherwise orient a shipment container prior to or during the printing to enable the printer 126 to properly access and/or align with the exterior surfaces to be printed on.

The printer module 316 may cause the printer to apply the customized graphics to the shipment container. For example, the printer module 316 may communicate to a print driver that causes the printer to print the customized graphics on specified sides of the shipment container.

The seal module 318 may apply a seal to the box, such as special tape, a sticker, and/or other types of identifiers, decorations, or protections, which may be associated with one or more of the manufacturer, merchant, item, or other order detail. For example, the shipment contain may be sealed with tape that contains the name of the merchant that sold the item to the customer.

Figure 4:
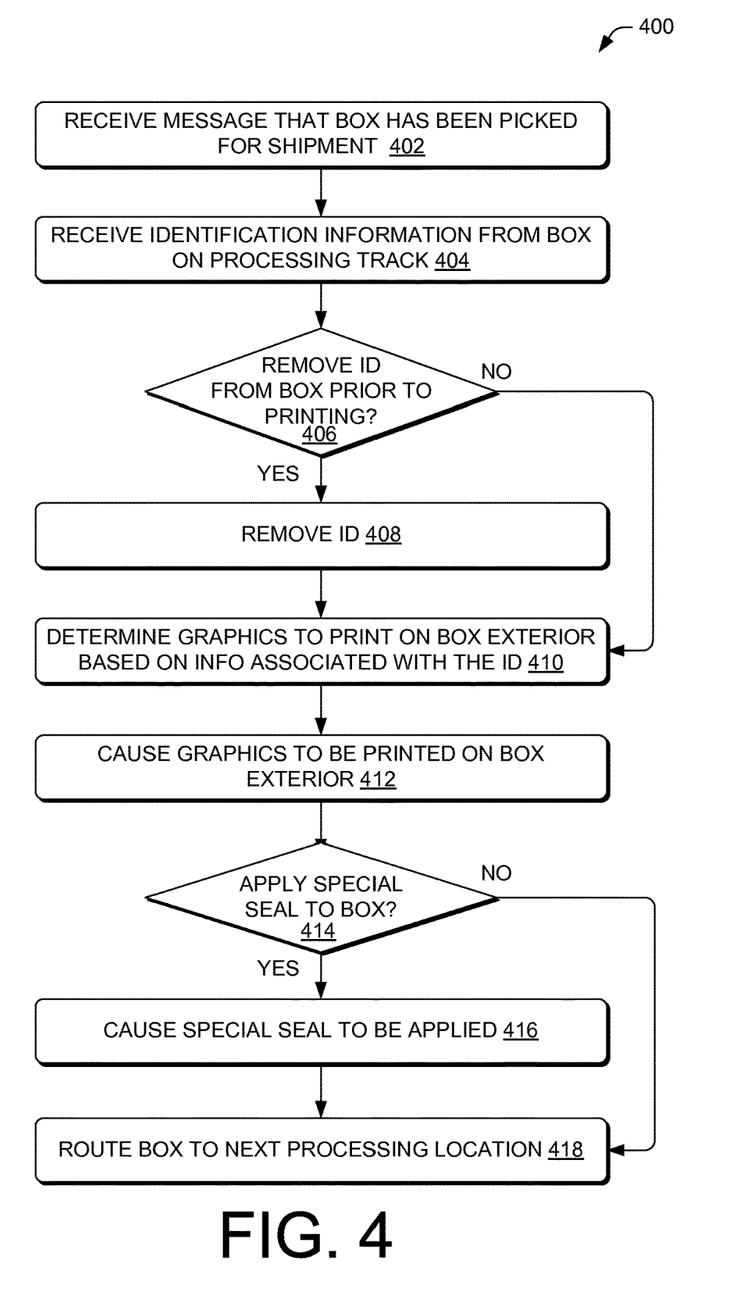
FIG. 4 is a flow diagram of an illustrative process to fulfill an order of an item, where the process includes printing customized graphics on an exterior of a box.
Figure 5:
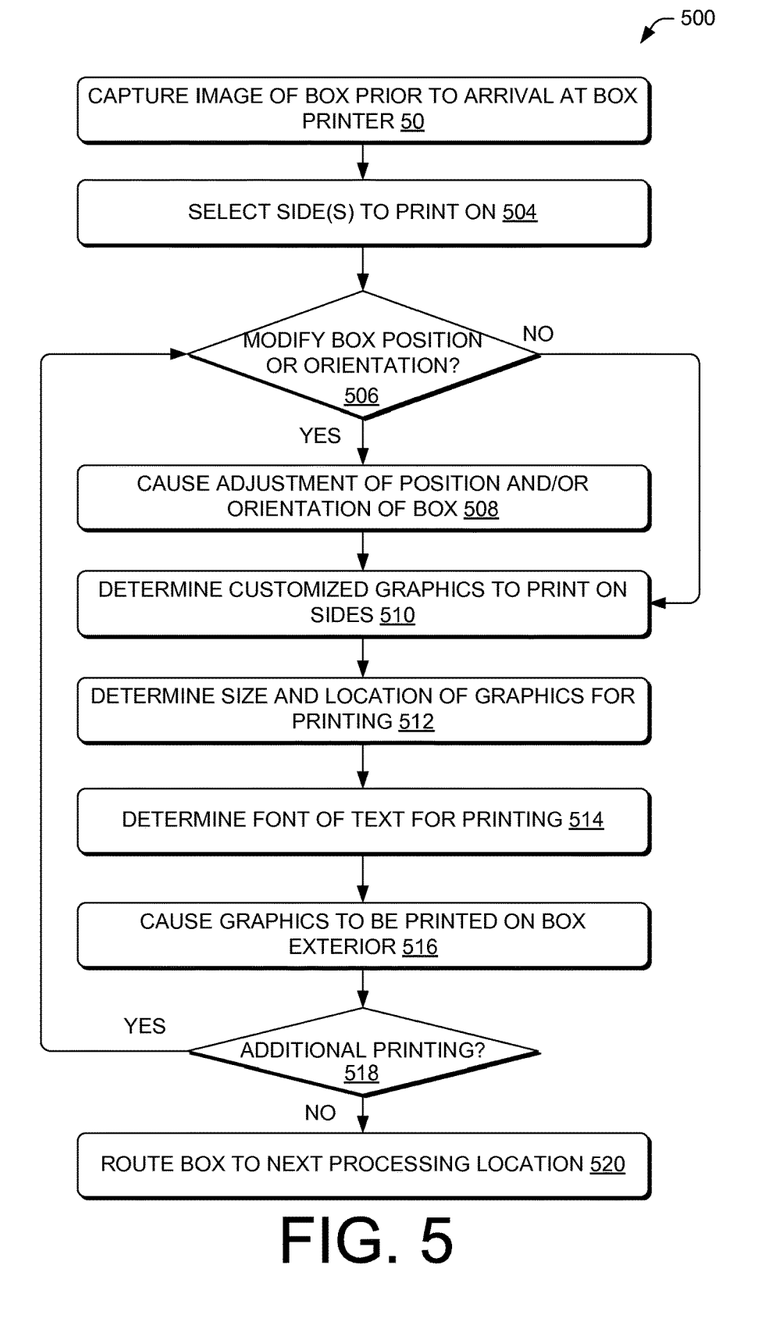
FIG. 5 is a flow diagram of an illustrative process to analyze a shipment container in preparation for printing, determine content to print, and print custom graphics on the shipment container.

FIGS. 4 and 5 show example processes that are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 4 is a flow diagram of an illustrative process 400 to fulfill an order of an item, where the process includes printing customized content on an exterior of a box. The process 400 may be performed by the server 120 and is described with reference to at least the computing architecture 300. However, other devices may also be used, at least in part, to perform the operations of the process 400.

At 402, the order processing module 308 may receive a message or confirmation that a box has been picked for shipment. The box may be a shipment container (e.g., the shipment container 200) that includes one or more items. The box may be placed on a processing track 114 as shown in FIG. 1, for further processing. Receipt of the message may initiate processing by the graphics content module 312 and/or may initiate other processing by the order processing module 308 that may be used in preparation for printing of graphics on the exterior surfaces of the box.

At 404, the box analyzer 310 may receive identification information from a box that is scanned/sensed by the sensor 118 to access information from the identifier 212. The identification information may be linked to one or more of the item data 320, the user data 322, and the order data 324.

At 406, the box analyzer 310 may determine whether to remove the identifier 212 (e.g., a label with an image code) from the box, deactivate an RFID device, and/or otherwise modify the box in preparation for printing on the exterior surfaces of the box. For example, the identifier may be attached to the box by a removable adhesive, a strap, or other removable device, which when removed, may enable access to a blank printable portion of the box, which was previously covered, but remains unaltered (e.g., smooth, undamaged). When the box analyzer 310 determines to remove (or disable) the identifier (following the "yes" route from the decision operation 406), then the process 400 may advance to an operation 408.

At 408, the identifier may be removed and/or disabled, such as by electronic and/or mechanical processes, human intervention, or both. For example, a machine may remove a tag on the box, where the tag includes the identifier.

When the box analyzer 310 determines not to remove (or disable) the identifier (following the "no" route from the decision operation 406), or following the operation 408, then the process 400 may advance to an operation 410. For example, no identifier may be removed when the identifier is located inside of the box (e.g., RFID card in or on the box), etc. At 410, the graphics content module 312 may determine customized graphics to print on exterior surfaces of the box based at least partly on information associated with the identifier. The information may be associated with one or more of the item data 320, the user data 322, and the order data 324.

At 410, the graphics content module 312 may determine which customized graphics to print based on various information associated with the order. For example, the graphics content module 312 may determine whether to include graphics that indicate a source of the item (e.g., a merchant and/or manufacturer), indicate the items inside of the box (e.g., include item information, images, etc.), and/or provide other personal information or other messages, advertisements, greetings, designs, icons, etc. For example, the graphics content module 312 may determine not to print some of this information in order to lessen a chance of theft of the box during shipment, to avoid spoiling a surprise, and/or for other reasons. In some embodiments, the graphics content module 312 may identify messages, advertising, recommendations, and/or other personalized content to include in the customized graphics to be printed on the box. For example, when the box contains a first item (e.g., toy airplane) that is related to a second item (e.g., a toy helicopter), the graphics content module 312 may include an image, text, or both to provide information about the second item to the recipient of the box. Other messages may include current events, such as holiday greetings ("Happy New Year"), personal greetings (e.g., "Happy Birthday"), and/or other messages (e.g., "Sale next week," "10% off toys on Feb 15"). Some messages may be provided by a sender of the box (purchaser of a gift, etc.).

At 412, the printer module 316 may cause the customized graphics determined by at the operation 410 to be printed by the printer 126 on the box. For example, the printer module 316 may transmit information to the printer 126 via a printer driver to cause the printer to print the customized graphics.

At 414, the seal module 318 may determine whether to cause a special seal to be applied to the box. For example, the seal module 318 may select or specify special tape, physical decorations, and/or other additions to be coupled to or affixed to the box, which may secure the box and/or provide information about a source of the box. For example, the seal module 318 may cause a security tape with the manufacturer or merchant to be used to further seal the box. When the seal module 318 determines to cause application of the seal (following the "yes" route from the decision operation 414), then the process 400 may advance to an operation 416. At 416, the seal module 318 may cause the special seal to be applied to the box, such as by causing a machine (such as the printer 126 or other labeling device) or human to affix the seal to the box.

When the seal module 318 determines not to cause application of the seal (following the "no" route from the decision operation 414), or following the operation 416, then the process 400 may advance to an operation 418. At 418, the order processing module 308 may route the custom printed box to a next processing location, such as to a loading dock to be loaded by a carrier.

FIG. 5 is a flow diagram of an illustrative process 500 to analyze a shipment container in preparation for printing, determine content to print, and print custom content on the shipment container. The process 500 may be performed by the server 120 and is described with reference to at least the computing architecture 300. However, other devices may also be used, at least in part, to perform the operations of the process 500. The process 500 includes further details of the printing that may be included in the process 400.

At 502, the box analyzer 310 may capture one or more images by the sensor 114 (or another sensor) of the box prior to the arrival of the box at the printer 126. The image(s) may indicate a size of the box, a shape of the box, a position of the box, printable locations on the box, and/or other attributes of the exterior surfaces of the box.

At 504, the box analyzer 310 (or the graphics content module 312) may determine which sides of the box to print on based on the images captured at the operation 502. The box analyzer 310 may select sides with maximized surface area, planar surfaces, surfaces free of marking, and so forth. In some embodiments, when the box has a designated place for printing, such as a blank space surrounded by a pattern, then the box analyzer 310 may identify a location of the designated place for printing.

At 506, the box analyzer 310 may determine whether to modify a position or orientation of the box prior to printing. For example, the box analyzer 310 may determine to print on a side that is facing downward (i.e., the side of box touching the processing track 114). In this situation, the box analyzer 310 may determine to modify an orientation of the box, for example. In another example, the box may be situated on the processing track in a matter where a surface is not parallel to a plane of operation of the printer. Thus, the box may be repositioned to align the surface with the plane to enable printing on the surface by the printer. When the box analyzer 310 determines to modify a position or an orientation of the box (following the "yes" route from the decision operation 506), then the process 500 may advance to an operation 508. At 508, the box analyzer 310 may cause adjustment of the position and/or orientation of the box. For example, the box analyzer 310 may cause a machine (or human) to align the box with a reference line/plane, rotate the box, and/or otherwise modify the position and/or orientation of the box.

When the box analyzer 310 determines not to modify a position or an orientation of the box (following the "no" route from the decision operation 506), or following successful modification via the operation 508, then the process 500 may advance to an operation 510. At 510, the graphics content module 312 may determine customized graphics to print on the sides of the box selected at the operation 504. The selection of the customized graphics may be limited based on the size and shape of the surfaces available for printing. For example, if little printable surface area is available, then fewer pieces of graphical information may be printed. Other attributes, such as graphics size, location, and font may be modified and may be used in this determination by the graphics content module 312. As discussed above, the customized graphics may include images, logos, patterns, designs, shipping information, text, advertisements, messages, recommendations, and/or other information.

At 512, the graphics content module 312 may determine a location and a size for the customized graphics to be printed on the box. For example, logos, images, and/or other information may be reduced in size, enlarged, and/or selected from available sizes for print. In some embodiments, the graphics content module 312 may implement guidelines to avoid printing graphics that are too large or too small, thus implementing maximum and minimum thresholds.

At 514, the graphics content module 312 may determine a font of text to be used in the printing. For example, the graphics content module 312 may select a font that is used by a merchant and/or a manufacturer.

At 516, the printer module 316 may cause the customized graphics determined by the operations 510-514 to be printed by the printer 126 on the box. For example, the printer module 316 may transmit information to the printer 126 via a printer driver to cause the printer to print the customized graphics.

At 518, the printer module 316 may determine whether additional printing is to occur, such as when a side of the box has not been printed upon, such as a side that is not available or exposed to the heads of the printer 126. When additional printing is to occur (following the "yes" route from the decision operation 518), then the process 500 may continue at the decision operation 506 as discussed above. When printing is complete (following the "no" route from the decision operation 518), then the process 500 may continue to an operation 520. At 520, the order processing module 308 may route the custom printed box to a next processing location, such as to a loading dock to be loaded by a carrier.

Figure 6:
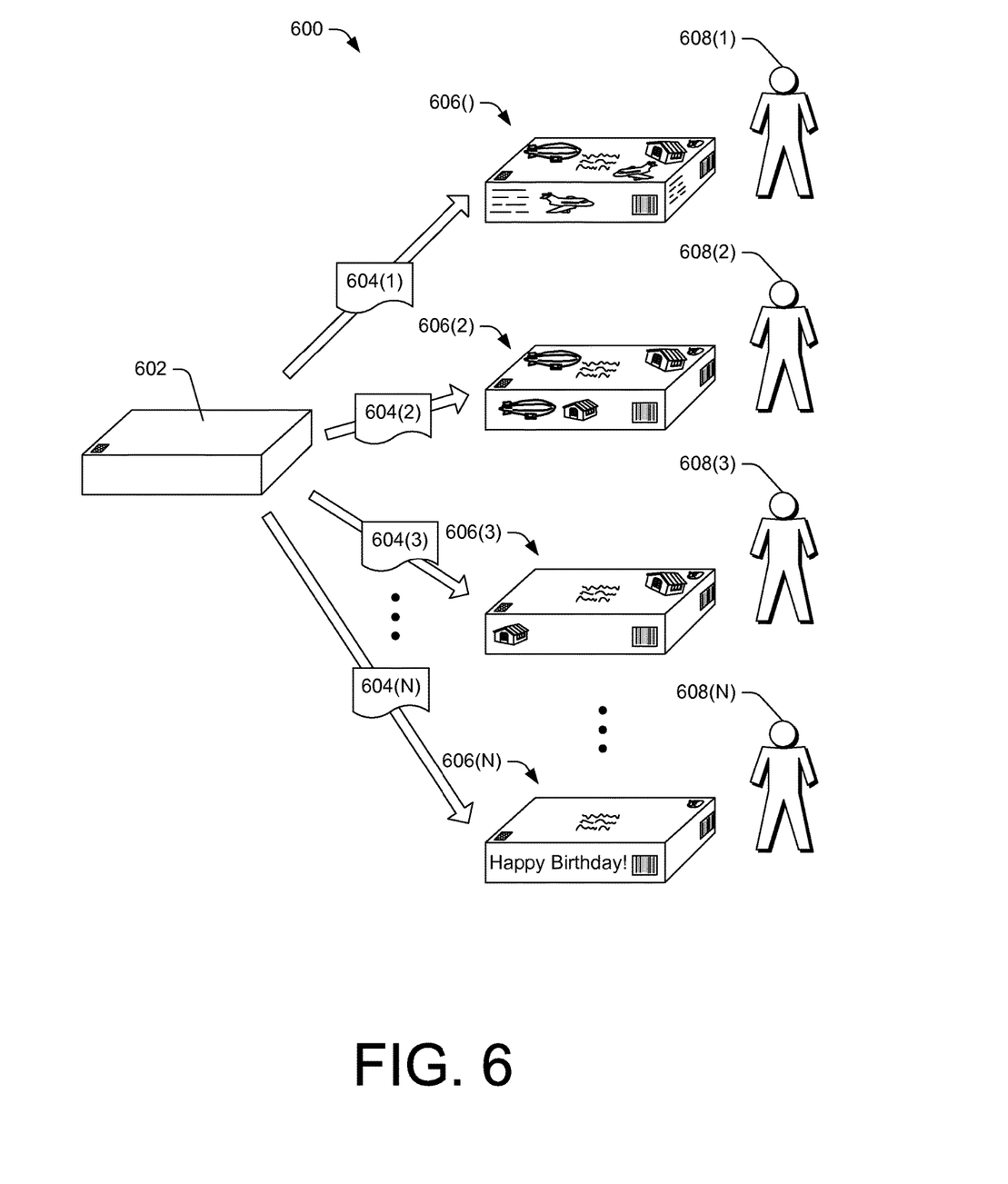
FIG. 6 is a schematic diagram showing different variations of customization of an exterior of a shipment container based at least partly on details of an order for the item.

FIG. 6 is a schematic diagram showing different variations 600 of customization of exterior surfaces of a shipment container based at least partly on details of an order for the item. The customization may be determined by the processes 400 and/or 500. A blank or mostly blank shipment container 602 may be printed in different ways even though the shipment container contains the same items and may possibly be going to a same recipient (although possibly at different times of the year, or sent by different people, etc.). Order data 604 may be used to determine the customized graphics 606, which may be applied by the printer 126 and viewable by the recipient 608.

A first instance of order data 604(1) may cause a first instance of customized graphics 606(1) to be printed for a first recipient 608(1). The first instance of the customized graphics 606(1) may include shipping information, merchant information, manufacture information, item information, and/or messages, which may not attempt to completely conceal information about the contents or source of the shipment container.

A second instance of order data 604(2) may cause a second instance of customized graphics 606(2) to be printed for a second recipient 608(2). The second instance of the customized graphics 606(2) may include shipping information, merchant information, manufacture information, and/or messages, which may not attempt to completely conceal information about the contents or source of the shipment container, but may not indicate the item (unlike the first instance of customized graphics 606(1)).

A third instance of order data 604(3) may cause a third instance of customized graphics 606(3) to be printed for a third recipient 608(3). The third instance of the customized graphics 606(3) may include shipping information and merchant information, which may attempt to completely conceal information about the contents or source of the shipment container.

A last instance of order data 604(N) may cause a last instance of customized graphics 606(N) to be printed for a last recipient 608(N). The last instance of the customized graphics 606(N) may include shipping information and a personalized message for the recipient 608(N), which may attempt to completely conceal information about the contents or source of the shipment container.

The customized graphics 606(1)-(N) are each different, besides possibly having different shipping information. Of course, other variations are possible besides those shown in the instances of the customized graphics shown in 606(1)-(N).

CONCLUSION

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
memory in communication with the one or more processors, the memory configured to at least store computer-executable instructions that, when executed by the one or more processors, cause the one or more processors to at least:
obtain identification information associated with a shipment container being processed for delivery, the identification information further associated with an order for an item contained within the shipment container, the order associated with order information;
receive, from an imaging sensor, data indicating at least dimensions associated with exterior surfaces of at least some of of a plurality of exterior surfaces of the shipment container;
select, based at least in part on the dimensions received, an exterior surface from the plurality of exterior surfaces to which to apply a customized graphic;
determine, based at least in part on the order information, the customized graphic to apply on the exterior surface, the customized graphic including shipping information and additional information comprising at least one of an identifier of a merchant offering the item, an identifier of a manufacturer who manufactured the item, or a personalized message for a recipient of the shipment container;
and
cause a labeling device to apply the customized graphic on the exterior surface of the shipment container.

2. The system as recited in claim 1, wherein the customized graphic includes a personalized message for the recipient, and wherein the personalized message includes at least one of:
a recommendation of another item, the recommendation determined based at least in part on the item included in the shipment container;
a message provided by a purchaser of the item; or
an advertisement for services provided by a merchant that is associated with the item.

3. The system as recited in claim 1, wherein the computer-executable instructions further cause the one or more processors to at least:
select a physical decoration based at least in part on the order information, the physical decoration associated with a merchant of a plurality of merchants that sell the item; and
cause the labeling device to apply the physical decoration to the shipment container.

4. The system as recited in claim 1, wherein the computer-executable instructions further cause the one or more processors to at least cause the labeling device to apply, to an interior surface of the shipment container, a graphic associated with the item, the graphic mimicking retail packaging of the item.

5. The system as recited in claim 1, wherein the computer-executable instructions further cause the one or more processors to at least:
determine a size and position of the shipping information and the additional information based at least in part on the dimensions received.

6. A computer-implemented method comprising:
obtaining identification information associated with a shipment container processed at a fulfillment center, the identification information associated with an order for an item contained within the shipment container, the order associated with order information;
receiving, from an imaging sensor, data indicating at least dimensions for each exterior surface of at least some of a plurality of exterior surfaces of the shipment container;
selecting the exterior surface of the plurality of exterior surfaces to which to apply the customized graphic based at least in part on the dimensions received;
determining, based at least in part on the order information, a customized graphic to include on an exterior surface of the shipment container, the customized graphic including shipping information and additional information comprising at least one of an identifier of a merchant offering the item, an identifier of a manufacturer who manufactured the item, or a personalized message for a recipient of the shipment container; and causing the customized graphic to be applied on the exterior surface of the shipment container.

7. The computer-implemented method as recited in claim 6, wherein determining the customized graphic is based at least in part on the dimensions received.

8. The computer-implemented method as recited in claim 6, further comprising determining a size and position of both the shipping information and the additional information based at least in part on the dimensions received.

9. The computer-implemented method as recited in claim 6, wherein the identification information is stored on a radio frequency identifier (RFID) component associated with the shipment container, and wherein the computer-implemented method further comprises obtaining the identification information from the RFID component.

10. The computer-implemented method as recited in claim 6, further comprising causing the customized graphic to be applied on at least one other exterior surface of the shipment container.

11. The computer-implemented method as recited in claim 6, further comprising generating an instruction to reposition or reorient the shipment container prior to application of the customized graphic on the exterior surface of the shipment container.

12. The computer-implemented method as recited in claim 6, wherein the shipment container includes the identification information as a tag, and the computer-implemented method further comprises causing a device to physically remove the tag from the shipment container prior to application of the customized graphic.

13. The computer-implemented method as recited in claim 6, wherein the exterior surface of the shipment container comprises a curved surface.

14. The computer-implemented method as recited in claim 6, wherein the customized graphic includes a personalized message for the recipient, and wherein the personalized message includes at least one of:
   a recommendation of another item based at least in part on the item included in the shipment container;
   a message provided by a purchaser of the item; or
   an advertisement for services provided by a merchant that is associated with the item.

15. The computer-implemented method as recited in claim 6, further comprising:

selecting a physical decoration based at least in part on the order information, the physical decoration associated with a merchant of a plurality of merchants that sell the item; and causing the physical decoration to be applied to the shipment container.

16. The computer-implemented method as recited in claim 6, further comprising:
   causing a graphic associated with the item to be applied to an interior surface of the shipment container, the graphic mimicking retail packaging of the item.

17. The computer-implemented method as recited in claim 6, further comprising:
   causing the position or orientation of the shipment container to be modified prior to the causing the customized graphic to be applied.

18. The computer-implemented method as recited in claim 6, further comprising:
   causing a seal to be applied to the box.

19. A computer-implemented method comprising:
   obtaining identification information associated with a shipment container processed at a fulfillment center, the identification information associated with an order for an item contained within the shipment container, the order associated with order information;
   receiving, from a sensor, data indicating at least dimensions for each exterior surface of at least some of a plurality of exterior surfaces of the shipment container;
   selecting the exterior surface of the plurality of exterior surfaces to which to apply the customized graphic based at least in part on the dimensions received;
   determining, based at least in part on the order information and the dimensions received, a customized graphic to include on an exterior surface of the shipment container, the customized graphic including shipping information and additional information comprising at least one of an identifier of a merchant offering the item, an identifier of a manufacturer who manufactured the item, or a personalized message for a recipient of the shipment container;
   determining a size and position of the customized graphic based at least in part on the dimensions received; and
   causing the customized graphic to be applied on the exterior surface of the shipment container.

* * * * *